(12) United States Patent
Duletzke

(10) Patent No.: US 6,276,713 B1
(45) Date of Patent: Aug. 21, 2001

(54) PASSENGER PROTECTION APPARATUS FOR A MOTOR VEHICLE

(75) Inventor: Scott J. Duletzke, Clinton Township, MI (US)

(73) Assignee: Textron Automotive Company Inc., Troy, MI (US)

(*) Notice: Subject to any disclaimer, the term of this patent is extended or adjusted under 35 U.S.C. 154(b) by 0 days.

(21) Appl. No.: 09/562,860

(22) Filed: May 1, 2000

(51) Int. Cl.[7] .................................................. B60R 21/16
(52) U.S. Cl. ............................................ 280/732; 280/752
(58) Field of Search .................................. 280/732, 752, 280/753, 751, 730.1, 748

(56) References Cited

U.S. PATENT DOCUMENTS

| 3,622,176 | | 11/1971 | Byer ...................................... 280/150 |
| 3,708,179 | | 1/1973 | Hulten .................................. 280/150 |
| 3,794,349 | | 2/1974 | Fuller ................................... 280/150 |
| 3,924,707 | * | 12/1975 | Renner et al. ......................... 180/90 |
| 3,951,427 | * | 4/1976 | Wilfert ................................. 280/732 |
| 4,198,075 | * | 4/1980 | Kob et al. ............................. 280/753 |
| 4,427,215 | * | 1/1984 | Weichenrieder et al. ............ 280/752 |
| 4,948,168 | * | 8/1990 | Adomeit et al. ...................... 280/732 |
| 5,443,285 | | 8/1995 | Boll ....................................... 280/732 |
| 5,536,043 | * | 7/1996 | Lang et al. ............................ 280/753 |
| 5,775,729 | * | 7/1998 | Schneider et al. ................. 280/730.1 |
| 5,797,620 | * | 8/1998 | Eyrainer ............................ 280/730.1 |
| 5,816,613 | * | 10/1998 | Specht et al. ......................... 280/753 |
| 5,895,069 | * | 4/1999 | Heilig et al. ....................... 280/730.1 |
| 6,092,836 | * | 7/2000 | Saslecov ............................ 280/730.1 |
| 6,131,950 | * | 10/2000 | Schroter .............................. 280/753 |

FOREIGN PATENT DOCUMENTS 42 09 604 A1   10/1992 (DE) .
42 17 173 A1   11/1993 (DE) .

* cited by examiner

Primary Examiner—Paul N. Dickson
(74) Attorney, Agent, or Firm—Hayes, Soloway, Hennessey, Grossman & Hage, PC

(57) ABSTRACT

A passenger protection apparatus for a motor vehicle is provided comprising a first interior trim member and a second interior trim member. The first interior trim member, preferably an instrument panel, is attached to the motor vehicle and the second interior trim member attached to the first interior trim member. The second trim member is attached to the first trim member such that the second interior trim member is removable from the first interior trim member without detaching the first interior tnm member from the motor vehicle The second interior trim member is located in the knee impact region of the motor vehicle and comprises a first energy management device in the form of an inflatable restraint apparatus having an airbag and an inflator. In this manner, the passenger protection apparatus provides a structure which includes an inflatable restraint apparatus which is easily replaceable in a motor vehicle without having to remove the instrument panel

20 Claims, 3 Drawing Sheets

PASSENGER PROTECTION APPARATUS FOR A MOTOR VEHICLE

FIELD OF THE INVENTION

The present invention relates to a passenger protection apparatus for a motor vehicle and, more particularly, a passenger protection apparatus which includes an inflatable restraint.

BACKGROUND OF THE INVENTION

Passenger collision protection devices are known in which an inflatable restraint apparatus is disposed within an instrument panel assembly. Upon airbag deployment, the instrument panel often permanently deforms necessitating replacement of the instrument panel in addition to the inflatable restraint apparatus. Replacement of the instrument panel, in addition to the inflatable restraint apparatus, is time consuming and expensive.

In addition to providing an inflatable restraint apparatus, instrument panel assemblies also may include a separate energy absorbing structure designed to absorb energy in response to the impact of a vehicle occupant's knee. Separate energy absorbing structures for the protection of a vehicle occupant's knees have been required as vehicle occupant's knees generally fall outside the range of the airbag used to protect the torso. In addition, these knee impact structures provide the occupant with an continual level of protection (i.e. in all vehicle frontal collisions), not only those in which the airbag is deployed. However, similar to an inflatable restraint, in response to a vehicle collision in which they permanently deform, the knee impact structures must be removed and replaced.

What is needed is a structure which includes an inflatable restraint apparatus which is easily replaceable in a motor vehicle without having to remove the instrument panel. Additionally, what is needed is a structure which provides an inflatable restraint apparatus and a knee impact structure integrated into a single structure for easy replacement.

SUMMARY OF THE INVENTION

A passenger protection apparatus for a motor vehicle is provided comprising a first interior trim member and a second interior trim member. The first interior trim member, preferably an instrument panel, is attached to the motor vehicle and the second interior trim member attached to the first interior trim member. The second trim member is attached to the first trim member such that the second interior trim member is removable from the first interior trim member without detaching the first interior trim member from the motor vehicle. The second interior trim member is located in the knee impact region of the motor vehicle and comprises a first energy management device in the form of an inflatable restraint apparatus having an airbag. In this manner, the passenger protection apparatus provides a structure which includes an inflatable restraint apparatus which is easily replaceable in a motor vehicle without having to remove the instrument panel.

The second trim member may comprise a second energy management device, preferably a polyurethane foam, configured to be impacted by a knee of a vehicle occupant. In this manner, the passenger protection apparatus provides an inflatable restraint apparatus and a knee impact structure integrated into a single structure for easy replacement.

Preferably, the second trim member comprises a cover such as a steering column cover, a knee bolster, or a glove compartment cover. Where the second trim member is a glove compartment cover, preferably the cover is disposed adjacent a glove compartment.

Preferably, the second trim member also comprises an outer shell overlying both the first energy management device and the second energy management device. The outer shell preferably forms an aperture through which an airbag may deploy.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE INVENTION

Figure 1:
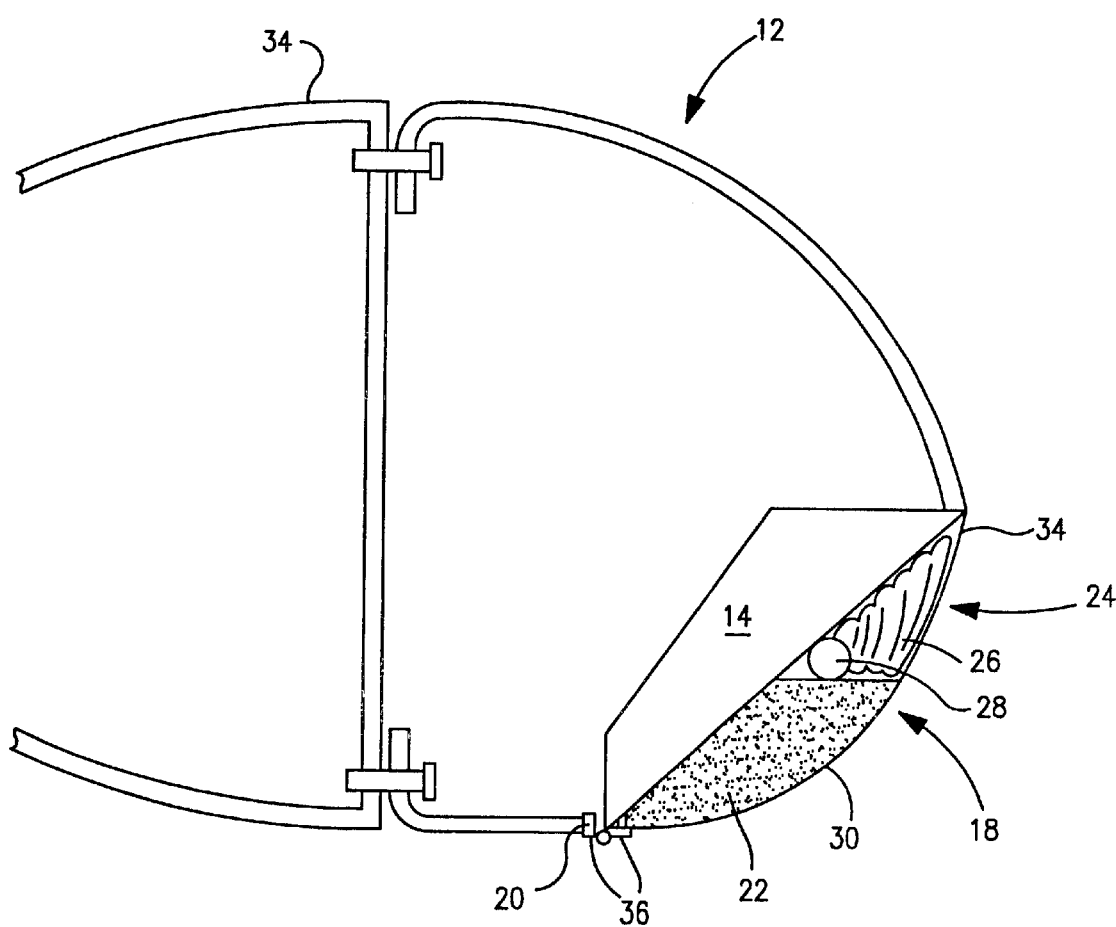
FIG. 1 is a cross-sectional view of a the passenger protection apparatus according to the present invention as a glove box door in a closed position.
Figure 2:
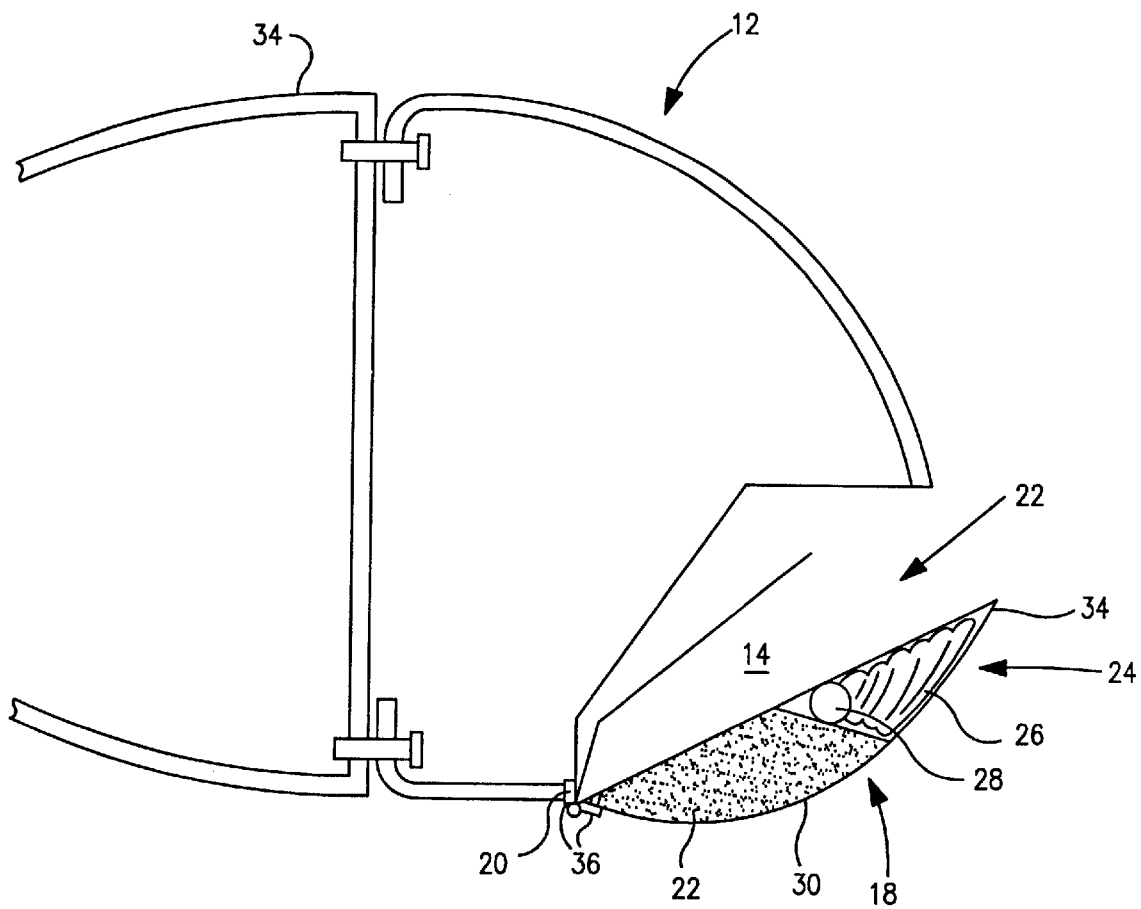
FIG. 2 is a cross-sectional view of a the passenger protection apparatus according to the present invention as a glove box door in a open position.
Figure 3:
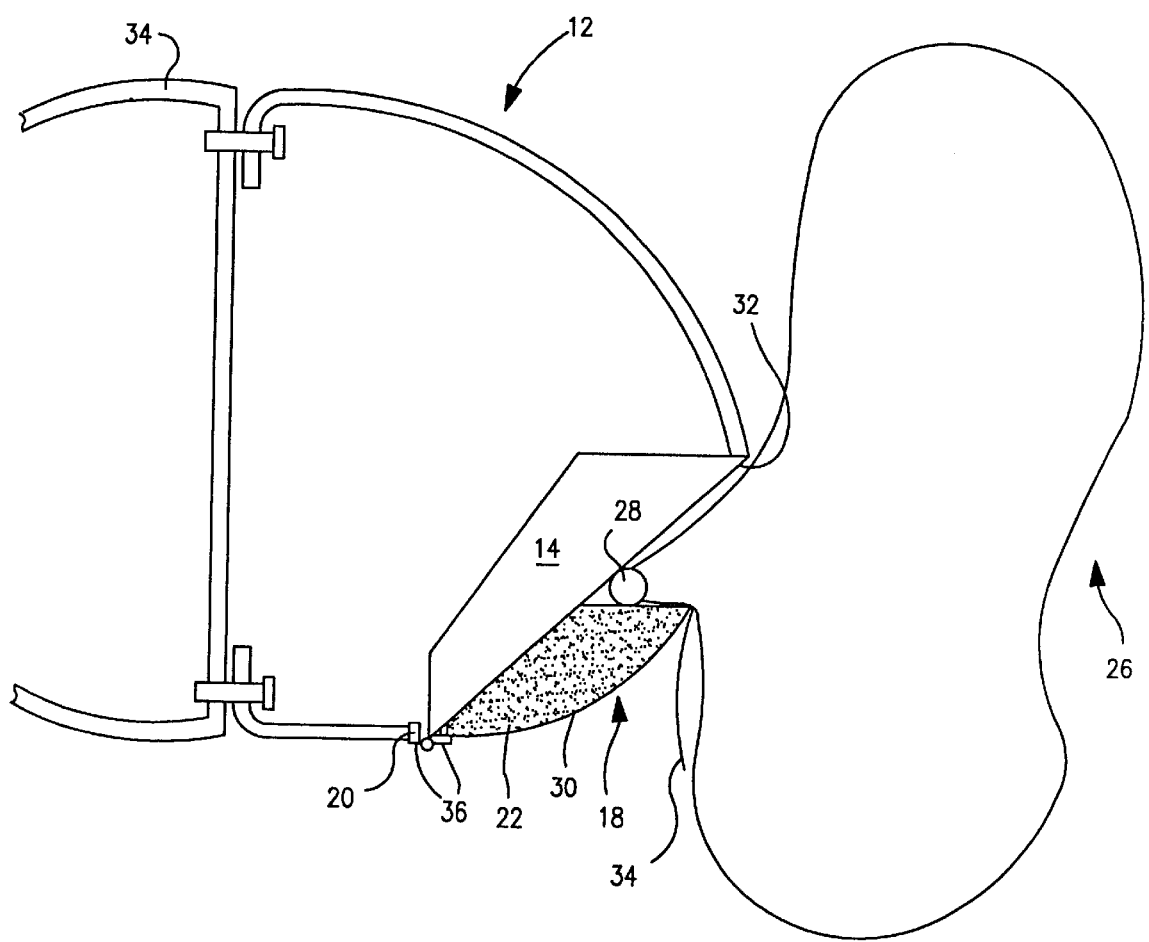
FIG. 3 is a cross-sectional view of the a the passenger protection apparatus according to the present invention as a glove box door after deployment of an airbag.

A first exemplary interior trim member in the form of instrument panel 12 is shown in FIGS. 1–3. Instrument panel 12 is attached to a portion of the chassis of a motor vehicle, such as the fire wall 34. A storage compartment in the form of a glove compartment 14 is disposed within the passenger side of instrument panel 12. A second exemplary interior trim member in the form of a cover 18 is preferably disposed adjacent and includes glove compartment 14. Cover 18 is preferably attached to instrument panel 12 by a hinge 20. As shown in FIGS. 1–3, cover 18 is preferably positioned below the horizontal midpoint of instrument panel 12 in the knee impact region of the instrument panel 12. Access to glove compartment 14 is provided by an aperture 22 while glove compartment 14 is in an open state.

In other embodiments glove compartment 14 may not be attached to the cover 18, but rather fixed within the confines of instrument panel 12. Also, in other embodiments, cover 18 may not be disposed adjacent a glove compartment. For example cover 18 may comprise a knee bolster or steering column cover, which covers the lower region of the instrument panel 12 on the driver's side of the vehicle (opposed to the passenger side of the vehicle where the glove compartment is normally located) below the steering column.

Cover 18 preferably comprises a knee impact structure 22. Knee impact structure 22 is suited for receiving an impact from a vehicle occupant's knees in response to a vehicle frontal collision. Knee impact structure 22 preferably absorbs force and energy exerted on the vehicle occupant's knees as a result of the impact, thus reducing the likelihood of injury. Preferably knee impact structure 22 comprises a polymer foam, and more preferably a polyurethane foam. Even more preferably knee impact structure 22 comprises a rigid polyurethane foam, such as disclosed in U.S. Pat. No. 5,232,957 assigned to the assignee of the present invention and hereby incorporated by reference.

Cover 18 also comprises an inflatable restraint apparatus 24 disposed adjacent knee impact structure 22. Inflatable restraint 24 comprises an airbag 26. Inflatable restraint 24 also preferably comprises an inflator 28. Airbag 26 preferably is of a size and shape to protect the torso and knees of a vehicle occupant in response to a vehicle frontal collision. In this manner, airbag 26 provides a second energy management device (i.e. absorbs or transmits energy) for the protection to the vehicle occupant's knees in addition to knee impact structure 22. Consequently, knee impact structure 22 affords the vehicle occupant's knees a level of protection in all vehicle frontal collisions (i.e. not just those where airbag 26 is deployed), while airbag 26 provides added protection to the vehicle occupant's knees in those particularly serious vehicle collisions where airbag 26 is deployed.

Knee impact structure 22 and inflatable restraint 24 of cover 18 are concealed by an outer shell 30. Preferably, outer shell 30 is continuous between knee impact structure 22 and inflatable restraint 24, and comprises a polymer material. More preferably outer shell 30 comprises a thermoplastic material such as polyvinyl chloride or polyurethane. In the event of a vehicle collision in which airbag 26 is deployed, the outer shell overlying inflatable restraint 24 forms an aperture 32 through which the airbag 26 may deploy in a manner known in the art.

Inflatable restraint 24 preferably also comprises a sensor, such as a switch, which senses whether cover 18 is in an open or closed position. If cover 18 is in an open position, preferably the firing circuit for inflatable restraint 24 is also in an open position and the inflatable restraint will not activate. Conversely, if cover 18 is in a closed position, preferably the firing circuit for inflatable restraint 24 is also in the closed position and the inflatable restraint will activate.

After use of knee impact structure 22 and/or inflatable restraint 24, cover 18 of the passenger protection apparatus of the present invention can be easily detached from the instrument panel 12 without damage and replaced without the cost or time involved with replacing instrument panel 12 of the prior art systems. Cover 18 may be removed from instrument panel 12 by removing the threaded fasteners 36, then replaced in similar fashion by reinstalling the threaded fasteners 36.

I intend the above description to illustrate embodiments of the present invention by using descriptive rather than limiting words. Obviously, there are many ways that one might modify these embodiments while remaining within the scope of the claims. In other words, there are many other ways that one may practice the present invention without exceeding the scope of the claims herein.

I claim:

1. A passenger protection apparatus for a motor vehicle comprising:
   a first interior trim member comprising an instrument panel attachable to the motor vehicle;
   a second interior trim member attached to the first interior trim member, the second interior trim member replaceable in the motor vehicle without detaching the first interior trim member from the motor vehicle;
   the second interior trim member located in the knee impact region of the instrument panel, the second interior trim member comprising a first energy management device therein and a second energy management device;
   the first energy management device comprising an inflatable restraint apparatus, the inflatable restraint apparatus comprising an airbag and an inflator disposed behind the airbag, the airbag of a size to protect the torso of a vehicle occupant; and
   the second energy management device comprising a knee impact structure, the knee impact structure in a position for a knee impact before and after a deployment of the airbag.

2. The passenger protection apparatus of claim 1 wherein the second energy management device comprises a polymer foam.

3. The passenger protection apparatus of claim 2 wherein the polymer foam is a polyurethane foam.

4. The passenger protection apparatus of claim 1 wherein the second interior trim member comprises a cover.

5. The passenger protection apparatus of claim 4 wherein the cover comprises a steering column cover.

6. The passenger protection apparatus of claim 4 wherein the cover comprises a knee bolster.

7. The passenger protection apparatus of claim 4 wherein the cover comprises a glove compartment cover.

8. The passenger protection apparatus of claim 1 wherein the second interior trim member comprises a glove compartment bin.

9. The passenger protection apparatus of claim 1 wherein the second interior trim member further comprises an outer shell, the outer shell overlying both the first energy management device and the second energy management device.

10. The passenger protection apparatus of claim 9 wherein the outer shell forms an aperture through which an airbag may deploy.

11. The passenger protection apparatus of claim 1 wherein the second interior trim member has an opened position and a closed position relative to the first interior trim member; and
    a deployment of the inflatable restraint apparatus is active when the second interior trim member is in the closed position and inactive when the second interior trim member is in the opened position.

12. A passenger protection apparatus for a motor vehicle comprising:
    a first interior trim member comprising an instrument panel attachable to the motor vehicle;
    a second interior trim member attached to the first interior trim member, the second interior trim member replaceable in the motor vehicle without detaching the first interior trim member from the motor vehicle;
    the second interior trim member located in the knee impact region of the instrument panel, the second interior trim member comprising a first energy management device therein and a second energy management device;
    the first energy management device comprising an inflatable restraint apparatus, the inflatable restraint apparatus comprising an airbag and an inflator disposed behind the airbag, the airbag of a size to protect the torso of a vehicle occupant; and
    the second energy management device comprising a knee impact structure, the knee impact structure in a position for a knee impact both before and after a deployment of the airbag, the knee impact structure disposed beside the inflatable restraint apparatus.

13. The passenger protection apparatus of claim 12 wherein the second energy management device comprises a polymer foam.

14. The passenger protection apparatus of claim 13 wherein the polymer foam is a polyurethane foam.

15. The passenger protection apparatus of claim 12 wherein the second interior trim member comprises a cover.

16. The passenger protection apparatus of claim 15 wherein the cover comprises a steering column cover.

17. The passenger protection apparatus of claim 15 wherein the cover comprises a knee bolster.

18. The passenger protection apparatus of claim 15 wherein the cover comprises a glove compartment cover.

19. The passenger protection apparatus of claim 12 wherein the second interior trim member comprises a glove compartment bin.

20. The passenger protection apparatus of claim 12 wherein the second interior trim member has an opened position and a closed position relative to the first interior trim member; and a deployment of the inflatable restraint apparatus is active when the second interior trim member is in the closed position and inactive when the second interior trim member is in the opened position.

\* \* \* \* \*